United States Patent [19]
Foote

[11] 3,977,221
[45] Aug. 31, 1976

[54] TAMPER-PROOF SET SCREW ASSEMBLAGE FOR LOCKING DEVICES

[75] Inventor: Daniel J. Foote, Wauwatosa, Wis.

[73] Assignee: Master Lock Company, Milwaukee, Wis.

[22] Filed: Aug. 25, 1975

[21] Appl. No.: 607,290

[52] U.S. Cl.................................. 70/58; 70/258; 280/507
[51] Int. Cl.² ........................................ E05B 73/00
[58] Field of Search.......................... 70/57, 58, 258; 85/1 SS, 35, 1 R, 9 R; 280/507

[56] References Cited
UNITED STATES PATENTS

| | | | |
|---|---|---|---|
| 2,424,871 | 7/1947 | Wenk.................................. | 72/313 |
| 3,410,580 | 11/1968 | Longennecker..................... | 280/507 |
| 3,526,110 | 9/1970 | Foote.................................. | 70/258 |

Primary Examiner—Robert L. Wolfe
Attorney, Agent, or Firm—Curtis B. Morsell, Sr.

[57] ABSTRACT

In certain types of locking devices a lockable, tool operated set screw is utilized to impingingly hold a pair of elements together. It is intended that the set screw cannot be operated unless it is unlocked and a tool is applied to a portion thereof. However, tamperers have discovered that a flexible cord or the like inserted into a crevice between the impinged elements and wrapped about a threaded shank portion of the set screw, can be effective for unauthorizedly turning the set screw to release the members held together by the set screw. To overcome this type of tampering the present invention provides a set screw in which the threads on its extreme outer end portion are eliminated and said portion of the set screw shank carries a freely turnable sleeve. Hence, should a tamperer apply a flexible cord or appliance to the accessible portion of the set screw (that which carries the turnable sleeve), pulls on the cord will only result in free turning of the sleeve without any turning of the set screw. Additional means are also provided for holding the sleeve on the set screw and for preventing such undue projection of the set screw which might cause it to be dislodged from the member into which it is threaded and into a cavity in the companion member.

5 Claims, 4 Drawing Figures

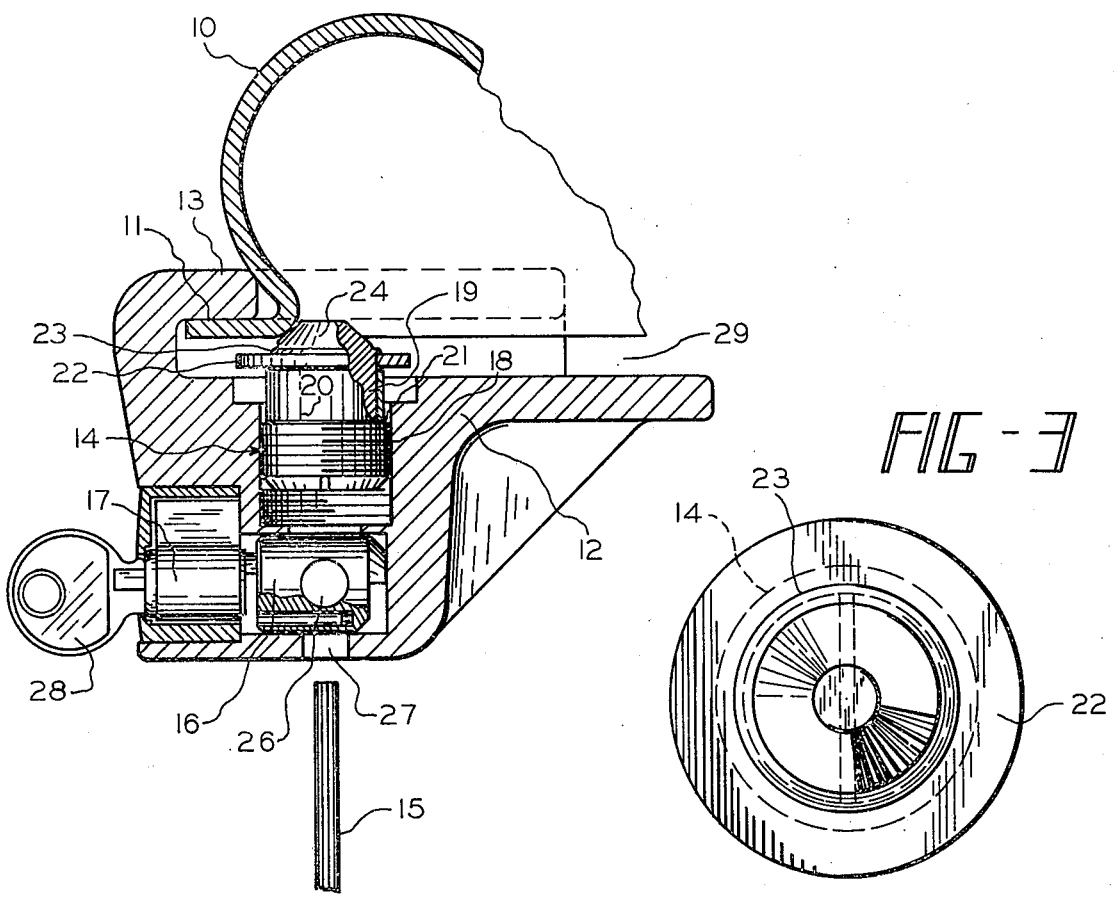
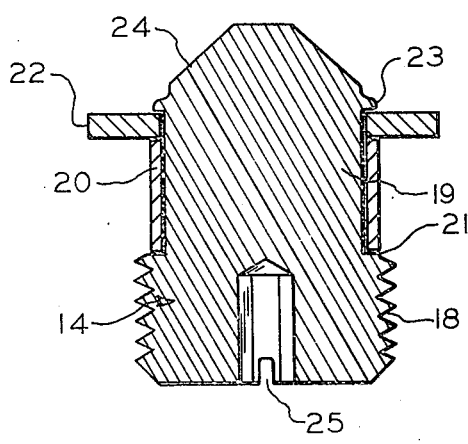
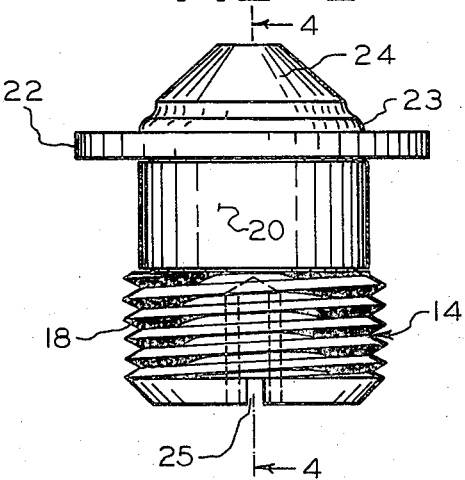

TAMPER-PROOF SET SCREW ASSEMBLAGE FOR LOCKING DEVICES

BACKGROUND OF THE INVENTION AND SUMMARY THEREOF

In the D. J. Foote U.S. Pat. No. 3,526,110 there is disclosed a trailer coupler cover lock in the form of a cover plate for lockable application to the open underside of a trailer hitch coupler to prevent unauthorized tow-away of a detached trailer through the application, by a thief, of a towing vehicle ball into the trailer hitch coupler socket. Said cover plate houses a set screw which, when adjusted, clamps a portion of a rim on the coupler socket against and under a portion of a flange on the cover plate. A lock controlled plug extension within the cover plate has a transverse bore therein, registering in one turned position of said plug extension with alined openings in the cover plate whereby an externally applied tool may engage and operate the set screw to control the blocking association as between the cover plate and the coupler socket. Thieves and tamperers, however, have developed a method of thwarting the intended tool controlled operation of said set screw. This is accomplished by the insertion of a strong flexible cord of the like into a crevice between the impinged cover plate and coupler socket and wrapping the same about an outer shank portion of the set screw. When the cord is pulled it will turn the set screw to a position which will thereby permit unauthorized disengagement of the protective cover plate from the mouth of the coupler socket. The present invention provides a construction which will prevent such unintended and unauthorized operations of the set screw by encasing the vulnerable portion of the set screw shank in a freely turnable sleeve which renders the set screw impervious to operation by a cord or tool unauthorizedly applied to an accessible portion of the shank of the set screw.

Applicant is not aware of any prior art wherein a lockable, tool manipulated set screw in the environment herein disclosed, has the outer end portion of the shank housed within a non-removable, but freely turnable sleeve.

A more specific object of the present invention is to provide, in a tamper-proof set screw assemblage for locking devices, a freely rotatable sleeve housing a portion of the set screw shank impervious to the unauthorized application of turning means thereto, capped by a non-removable, freely turnable washer which holds the sleeve on the set screw and which cannot be operated so as to transmit turning movement to the set screw.

Still further objects of the invention are to provide a tamper-proof lock-associated set screw of the character described which is simple in design and construction, which is inexpensive and easy to apply, which functions very effectively for its intended purpose, and which is strong and durable.

BRIEF DESCRIPTION OF THE DRAWING

In the accompanying drawing wherein the same reference characters indicate the same parts in all of the views:

FIG. 1 is a fragmentary vertical sectional view of a cover plate applied to the open mouth of a trailer hitch coupler and locked in impingement therewith by a tool operated set screw, there being a fragmentary showing of a tool shank which may be entered into the cover plate and engaged with the set screw to turn the latter when the lock controlled mechanism so permits, the illustrated set screw having the inner end portion of its shank unthreaded and covered by a freely turnable sleeve which is capped by a retaining washer;

FIG. 2 is an enlarged side view of the set screw with its sleeve and retaining washer;

FIG. 3 is a plan view of the showing in FIG. 2; and

FIG. 4 is a vertical sectional view taken on Line 4—4 of FIG. 2.

DESCRIPTION OF THE PREFERRED EMBODIMENT

Although the improved tamper-proof padlock is susceptible of more general usage, merely by way of example it has been illustrated in a trailer coupler cover lock assemblage.

As is shown in FIG. 1 the socket of a popular type of trailer hitch coupler is indicated by the numeral 10 and the entrance to the same is surrounded by an outwardly projecting horizontal rim 11. For guarding against undesired entrance to the socket a cover plate 12 is provided which is similar to that shown in U.S. Pat. No. 3,526,110 and which includes an inturned flange 13 against which the socket rim 11 may be releasably locked in impingement by a threaded turnable set screw 14. The manner in which entrance of an operating tool 15 to the inner end of the set screw is controlled by a key operated lock 17, is fully explained in prior U.S. Pat. No. 3,526,110.

The improved set screw 14 is shown in detail in FIGS. 2, 3 & 4. As opposed to standard practice the threads 18 on the set screw shank terminate substantially inwardly of the impingeable outer end of the set screw shank. Said portion of the set screw shank is of reduced diameter as indicated by the numeral 19, and carries a sleeve 20 whose lower or inner end portion seats on a shoulder 21 formed at the junction of the outermost thread with the inner end of the reduced diameter shank portion 19. Said sleeve 20 is freely turnable on the set screw shank portion 19 so that any unauthorized turning movement which a tamperer might apply to the sleeve 20 will have no effect on the set screw. The sleeve 20 is capped by a washer 22 of substantially greater diameter, said washer freely turnably encircling the set screw portion 19 adjacent the outer end of the sleeve and being non-removably retained on said portion of the set screw shank by an annular protuberance or bead 23. Beyond said bead the extremity of the set screw shank is outwardly tapered, as at 24, to provide inclined impingement surfaces for the purpose illustrated in FIG. 1 and as explained in prior U.S. Pat. No. 3,526,110.

When the improved tamper-proof set screw is functioning in an assemblage in which the slowing in FIG. 1 is merely representative, it is intended that the set screw may only be turned for engaging it with or disengaging it from joined or impingeable members by an externally applied tool 15 which can be entered into the tool slot or recess 25 in the base end of the set screw. In the illustrated assemblage when the key controlled lock 17 is operated, the associated internal plug extension 16 will be turned to a position wherein a bore therein 26 registers with a tool opening 27 in a base of the cover plate 12 and with the slot or recess 25 in the base end of the set screw. It is intended, therefore, that the set screw 14 may only be operated by a tool applied by an authorized person who also possesses a key 28 needed for operating the lock 17 for the alinement of the plug extension bore 26 with the opening 27 and the set screw slot 25.

However, as was explained earlier herein thieves and tamperers have developed an operation (relative to the showing in U.S. Pat. No. 3,526,110) which eliminates the need for the proper application of a turning tool to the base end of the set screw. A thief may insert a strong flexible cord or tool into a crevice or gap 29 between the impinged complementary members 10 and 12. By thus engaging the outer end of the set screw it can be unauthorizedly turned and released. This contingency is completely eliminated by the improved set screw 14 because the only portion of the set screw which is possibly accessible to a thief is that portion which, in the present invention, is encased by the freely turnable sleeve 20 capped by the freely turnable washer 22. If a tool or cord or the like engages one or the other of these protective elements, the free turning thereof will prevent the transmission of turning movement to the set screw.

The washer 22 turnably confined on the set screw also serves another purpose. Should the set screw by turned too far by a tool applied thereto the washer will limit its outward movement and prevent the set screw from being completely unthreaded from its member and dropping into the interior of coupler socket, or the like.

The improved tamper-proof set screw assemblage for locking devices is easy and inexpensive to manufacture and apply, is of strong and safe construction, and is well adapted for its intended purposes.

What is claimed as the invention is:

1. In combination, a locking device which includes a pair of complementary members; means for securing said members in impinging relationship including: a set screw threadably carried by one of said members and having an inner shank portion engageable with a portion of one of said members to releasably hold it in a desired relation relative to the other of said members, the first mentioned member having enclosed means for controlling the authorized actuation of the set screw; a sleeve freely turnably carried by a possibly exteriorally accessible portion of the set screw shank and inwardly of its extremity to block possible engagement of said portion of the set screw shank by an instrumentality unauthorizedly applied thereto by a tamperer whereby the sleeve will turn freely on the set screw shank to prevent unauthorized turning of the latter; and means on the set screw shank capping said sleeve to prevent removal of the sleeve from said portion of the set screw shank.

2. The combination recited in claim 1 wherein the member capping the sleeve is a washer.

3. The combination recited in claim 2 wherein said washer is freely turnably carried by said set screw shank.

4. The combination recited in claim 3 wherein means are provided for preventing removal of the sleeve and washer from the set screw shank.

5. The combination recited in claim 4 wherein the portion of the set screw shank which carries the sleeve is unthreaded and said portion of the set screw shank is of a reduced diameter and is also formed with means for preventing axial removal from said shank portion of the washer which caps the sleeve.

* * * * *